United States Patent
Tranier et al.

(10) Patent No.: US 12,552,668 B2
(45) Date of Patent: Feb. 17, 2026

(54) METHOD FOR SEPARATING HYDROGEN AND NITROGEN FROM CRACKED AMMONIA

(71) Applicant: L'Air Liquide, Société Anonyme pour l'Etude et l'Exploitation des Procédés Georges Claude, Paris (FR)

(72) Inventors: Jean-Pierre Tranier, L'Hay-les-Roses (FR); François Fuentes, Le Vesinet (FR)

(73) Assignee: L'Air Liquide, Societe Anonyme Pour l'Etude et l'Exploitation des Procedes Claude Georges, Paris (FR)

(*) Notice: Subject to any disclaimer, the term of this patent is extended or adjusted under 35 U.S.C. 154(b) by 553 days.

(21) Appl. No.: 18/086,926

(22) Filed: Dec. 22, 2022

(65) Prior Publication Data
US 2024/0208813 A1 Jun. 27, 2024

(51) Int. Cl.
*C01B 3/50* (2006.01)
*B01D 53/00* (2006.01)
(Continued)

(52) U.S. Cl.
CPC .......... *C01B 3/506* (2013.01); *B01D 53/002* (2013.01); *B01D 53/047* (2013.01); *C01B 3/047* (2013.01);
(Continued)

(58) Field of Classification Search
CPC .......... C01B 3/506; C01B 3/047; C01B 3/56; C01B 2203/042; C01B 2203/046; C01B 2203/0465; C01B 2203/84; B01D 53/002; B01D 53/047; F01K 25/08; F25J 3/062; F25J 3/0655; F25J 3/066; F25J 2200/70;
(Continued)

(56) References Cited

U.S. PATENT DOCUMENTS

| 3,126,266 A | 3/1964 | Meisler |
| 3,257,812 A * | 6/1966 | Shaievitz ............... F25J 3/0655 62/934 |

(Continued)

OTHER PUBLICATIONS

PCT Search Report and Written Opinion for PCT/US2023/084092, mailed Jun. 25, 2024.

*Primary Examiner* — Anthony J Zimmer
*Assistant Examiner* — Syed T Iqbal
(74) *Attorney, Agent, or Firm* — Allen E. White

(57) ABSTRACT

A method for separating hydrogen and nitrogen from a gas mixture, including a) thereby partially condensing a hydrogen and nitrogen gas mixture and producing a two-phase stream, b) phase separating the two-phase stream, producing a nitrogen-enriched liquid fraction and a hydrogen-enriched gaseous fraction, c) expanding the nitrogen-enriched liquid fraction, producing a lower-pressure nitrogen-enriched liquid or two-phase stream, d) adding heat to the lower-pressure nitrogen-enriched liquid stream, producing a warm nitrogen enriched gaseous stream, and e) adding heat to the hydrogen-enriched gaseous fraction, producing a hydrogen-rich product stream. Wherein, at least a portion of the heat added in step d) is removed in step a), at least a portion of the heat added in step e) is removed in step a), or at least a portion of the heat added in step d) and at least a portion of the heat added in step e) is removed in step a).

12 Claims, 4 Drawing Sheets

(51) Int. Cl.
  *B01D 53/047* (2006.01)
  *C01B 3/04* (2006.01)
  *C01B 3/047* (2026.01)
  *C01B 3/506* (2026.01)
  *C01B 3/56* (2006.01)
  *F01K 25/08* (2006.01)
  *F25J 3/06* (2006.01)

(52) U.S. Cl.
  CPC ............... *C01B 3/56* (2013.01); *F01K 25/08* (2013.01); *F25J 3/062* (2013.01); *F25J 3/0655* (2013.01); *F25J 3/066* (2013.01); *C01B 2203/042* (2013.01); *C01B 2203/046* (2013.01); *C01B 2203/0465* (2013.01); *C01B 2203/84* (2013.01)

(58) Field of Classification Search
  CPC .. F25J 2205/04; F25J 2205/40; F25J 2205/64; F25J 2205/66; F25J 2210/20; F25J 2215/04; F25J 2230/20; F25J 2230/24; F25J 2230/30; F25J 2230/42; F25J 2235/42; F25J 2245/42; F25J 2260/20; F25J 2270/02; F25J 2270/04; F25J 2270/06; F25J 3/0252; F25J 3/0257; F25J 3/0219
  See application file for complete search history.

(56) References Cited

U.S. PATENT DOCUMENTS

| | | | | |
|---|---|---|---|---|
| 3,643,452 | A * | 2/1972 | Ruhemann | B01D 45/14 62/910 |
| 4,356,014 | A * | 10/1982 | Higgins | F25J 3/062 62/622 |
| 2012/0100063 | A1 * | 4/2012 | Bao | C01C 1/0405 423/359 |
| 2017/0203963 | A1 * | 7/2017 | Ravikumar | C01B 17/04 |
| 2019/0084831 | A1 * | 3/2019 | Andersen | F02C 3/28 |
| 2021/0331917 | A1 * | 10/2021 | Turney | F25J 1/0208 |

* cited by examiner

METHOD FOR SEPARATING HYDROGEN AND NITROGEN FROM CRACKED AMMONIA

BACKGROUND

Liquid ammonia could be an important source for hydrogen production or an important energy carrier, especially for electricity generation in regions with little or no fuel sources. As an energy carrier, liquid ammonia can also serve as a source to balance fluctuating electricity generation by renewable energy technologies such as wind, solar and hydro. The advantage of ammonia as an energy carrier is that liquid ammonia is easier to transport and store than gaseous or liquid hydrogen.

There is a need in the industry for an efficient means for separating the constituent hydrogen and nitrogen from ammonia.

SUMMARY

A method for separating hydrogen and nitrogen from a gas mixture, including a) thereby partially condensing a hydrogen and nitrogen gas mixture and producing a two-phase stream, b) phase separating the two-phase stream, producing a nitrogen-enriched liquid fraction and a hydrogen-enriched gaseous fraction, c) expanding the nitrogen-enriched liquid fraction, producing a lower-pressure nitrogen-enriched liquid or two-phase stream, d) adding heat to the lower-pressure nitrogen-enriched liquid stream, producing a warm nitrogen enriched gaseous stream, and e) adding heat to the hydrogen-enriched gaseous fraction, producing a hydrogen-rich product stream. Wherein, at least a portion of the heat added in step d) is removed in step a), at least a portion of the heat added in step e) is removed in step a), or at least a portion of the heat added in step d) and at least a portion of the heat added in step e) is removed in step a).

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

Figure 1:
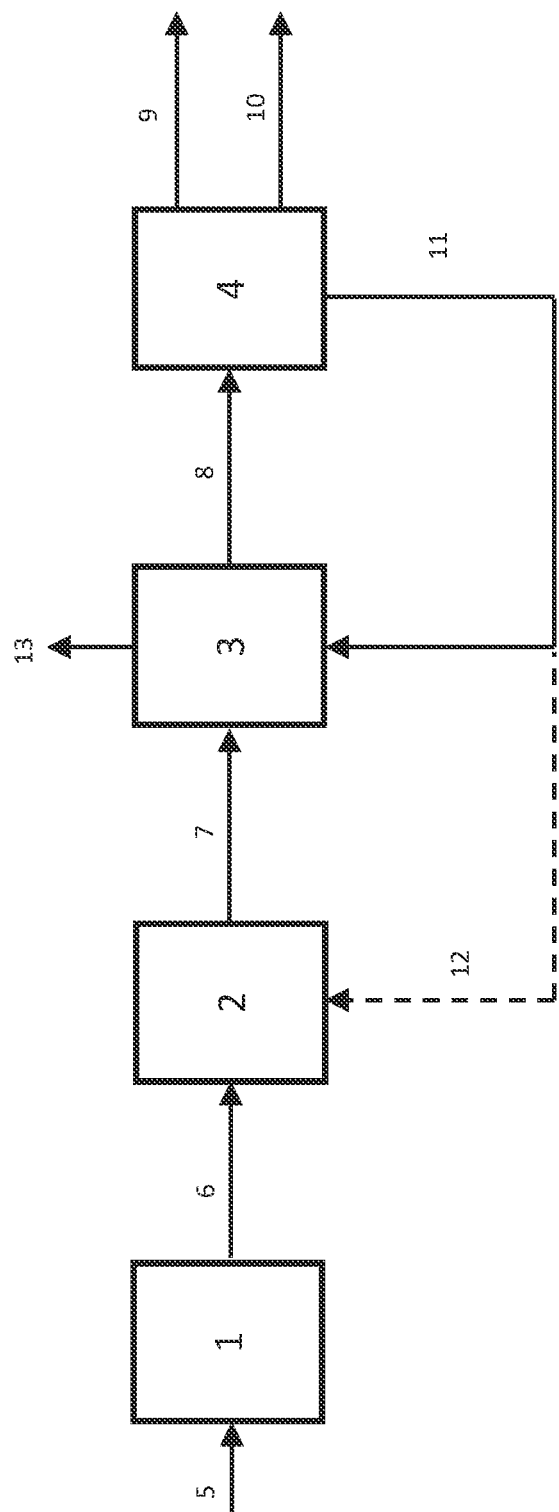
FIG. 1 is a schematic representation of the overall system, in accordance with one embodiment of the present invention.

Element Numbers
1=first process section
2=second process section
3=third process section
4=fourth process section
5=liquid ammonia feed
6=first process section effluent fluid stream
7=second process section effluent fluid stream
8=third process section effluent fluid stream
9=nitrogen stream
10=hydrogen stream
11=recycle stream
12=recycle stream portion to process section 2
13=third process section waste stream
201=feed stream
202=feed gas compressor (optional)
203=feed stream/compressed feed stream
204=main heat exchanger
205=cold feed stream
206=phase separator
207=liquid fraction
208=vapor fraction
209=Joule-Thompson valve
210=low-pressure liquid fraction
211=nitrogen-rich stream
212=nitrogen-rich stream compressor (optional)
213=nitrogen-rich export stream/compressed nitrogen-rich export stream
214=cooled hydrogen-rich stream
215=hydrogen-rich stream expander
216=low-pressure hydrogen-rich stream
217=hydrogen-rich product stream
220=product nitrogen-rich stream
221=nitrogen-rich fuel stream
222=ammonia cracking unit (optional)
301=feed stream
302=feed gas compressor (optional)
303=feed stream/compressed feed stream
304=main heat exchanger
305=cold feed stream
306=first phase separator
307=first liquid fraction
308=first vapor fraction
309=first Joule-Thompson valve
310=first low-pressure liquid fraction
311=nitrogen-rich stream
312=nitrogen-rich stream compressor (optional)
313=nitrogen-rich export stream/compressed nitrogen-rich export stream
314=cooled hydrogen-rich stream
315=hydrogen-rich stream expander
316=low-pressure hydrogen-rich stream
317=first hydrogen-rich product stream
318=second phase separator
319=second liquid fraction
320=second Joule-Thompson valve
321=second low pressure liquid fraction
322=second vapor fraction
325=second hydrogen-rich product stream
326=Pressure Swing Adsorption unit (optional)
328=purified hydrogen-rich product stream
331=export nitrogen-rich product stream
332=nitrogen-rich stream to ammonia cracking unit
333=ammonia cracking unit
401=feed stream
402=feed gas compressor
403=compressed feed stream
404=main heat exchanger
405=cold feed stream
406=first phase separator
407=first liquid fraction
408=first vapor fraction
409=first Joule-Thompson valve
410=first low-pressure liquid fraction
411=nitrogen-rich stream
412=nitrogen-rich stream compressor
413=compressed nitrogen-rich stream 414=cooled hydrogen-rich stream
415=hydrogen-rich stream expander
416=low-pressure hydrogen-rich stream
417=first hydrogen-rich product stream
418=second phase separator
419=second liquid fraction
420=second Joule-Thompson valve
421=second low pressure liquid fraction
422=second vapor fraction
425=second hydrogen-rich product stream
426=first cold supercritical stream
427=portion (of second liquid fraction)
428=third phase separator
429=third liquid fraction
430=third vapor fraction
431=compressed portion (of second liquid fraction)
432=second cold supercritical stream
433=high-pressure high-purity nitrogen-rich stream
434=portion (of first hydrogen-rich product stream)
435=Pressure Swing Adsorption unit (optional)
436=hydrogen gaseous stream
437=export hydrogen-rich product stream
438=export stream

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present method relates to a means for producing hydrogen from ammonia, comprising for example a catalytic cracking method of ammonia to obtain a mixture comprising mainly hydrogen and nitrogen as well as unconverted ammonia, a mixture purification system in particular to remove ammonia and a cryogenic method of nitrogen-hydrogen separation by partial condensation. This makes it possible to obtain a hydrogen recovery significantly higher than that of a PSA process (typically 99% versus 89%).

The term "about 30 bar pressure" means as close to 30 bar pressure as is reasonable given the conditions. As used herein, "about 30 bar pressure" is defined as meaning 30 bar plus or minus 20%. Other instances of the preposition "about" should be interpreted in a similar fashion.

As used herein, the term "ambient temperature" is defined as the temperature of the surrounding air. Ambient temperature may be defined as between 0 and 38° C. Ambient temperature may be defined as between 10 and 27° C. Ambient temperature may be defined as between 18 and 25° C.

As used herein, the term "cryogenic" is defined in its normal meaning as concerning any liquid at a temperature below −73° C., preferably below −120° C., more preferably below −180° C.

FIG. 1 represents a block diagram of the overall process. Liquid ammonia feed 5 is coming from a liquid ammonia storage (not shown). To avoid stress corrosion cracking of carbon steel at least 0.2% of water was added before transportation and/or storage. Liquid ammonia feed 5, which may be at a temperature of around −33° C., is fed to section 1 where it is pumped, evaporated under pressure (typically between 20 and 40 bar abs) and superheated to a temperature above ambient to form fluid stream 6. Such a process could also be connected to a high-pressure gaseous ammonia pipeline. In that case, section 1 may not be necessary.

Fluid stream 6 is introduced in section 2 where it is preheated, cracked at high temperature (typically between 500° C. and 800° C.) in the presence of a catalyst in order to convert NH3 into H2 and N2 following the reaction: 2 NH3→3 H2+N2. The mixture containing N2, H2, unconverted NH3 (typically between 0.3% and 3% of feed) and some water is then cooled in section 2 to form fluid 7. Fluid 7 is introduced in section 3 where ammonia and water are removed from the mixture. Part or all of this purification could be done by adsorption. Waste stream 13 and fluid stream 8 exit section 3.

Fluid 8 containing mainly N2 and H2 enters section 4 where N2 and H2 will be separated and purified by partial condensation at a cryogenic temperature. N2 stream 9, and H2 stream 10, as well as recycle stream 11 exit section 4. Recycle stream 11 may be reintroduced into section 3, or a portion (stream 12) may be introduced into section 2. The present invention is related to this particular section of the overall process. State of the art solution would be to use a H2 PSA (PSA=Pressure Swing Adsorption) to separate H2 from N2.

Figure 2:
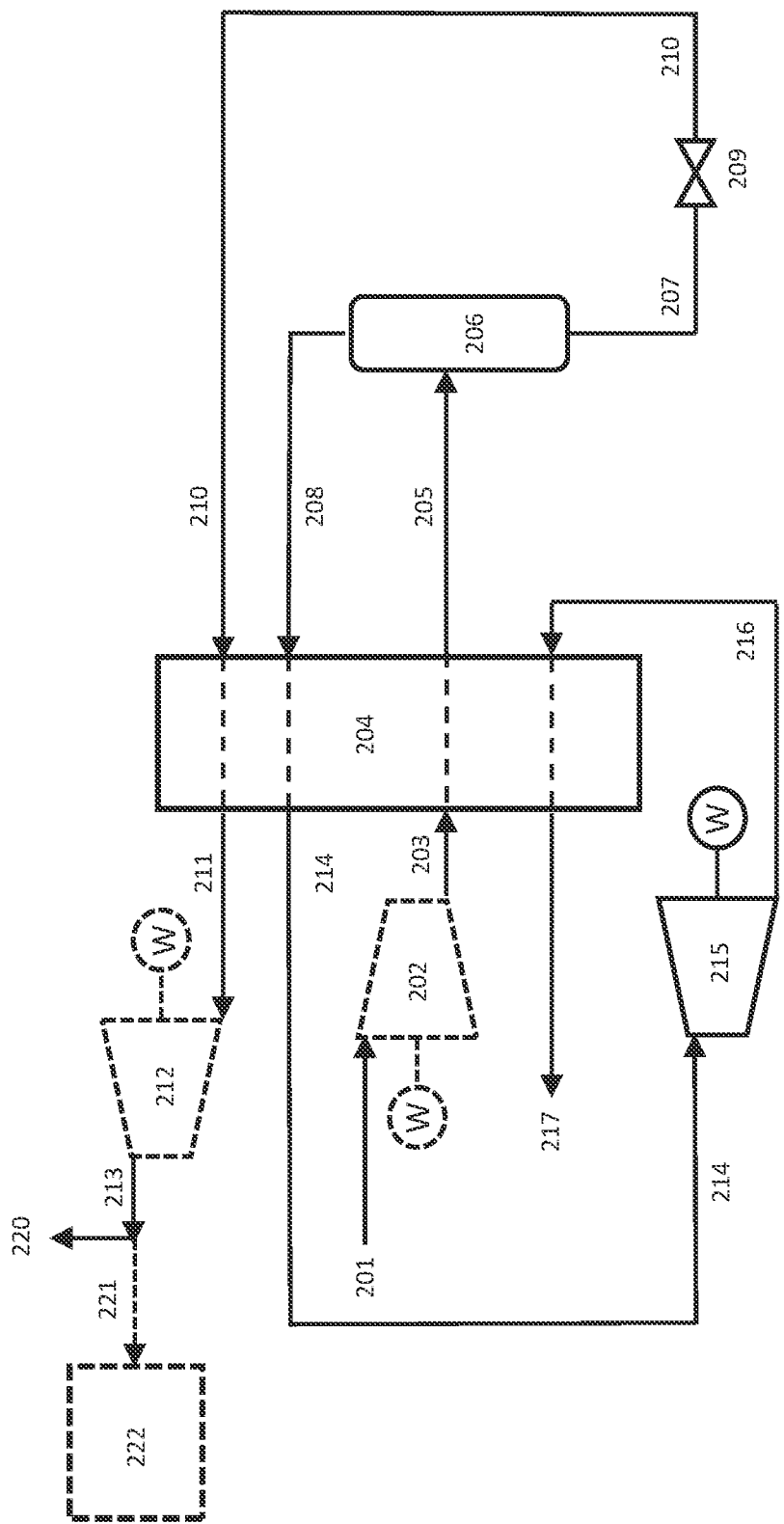
FIG. 2 is a schematic representation of a process scheme, in accordance with one embodiment of the present invention.

Turning to FIG. 2, one embodiment of the present invention is presented. Feed stream 201 is introduced into main heat exchanger 204. Feed stream 201 contains hydrogen and nitrogen and may come from an ammonia cracking unit (not shown). Feed stream 201 may have the pressure increased in optional feed gas compressor 202, thereby optionally producing compressed feed stream 203. Feed stream 201 may contain approximately 75 mol % of hydrogen and 25% of nitrogen corresponding to the above-mentioned reaction stoichiometry. Feed stream 201 may be at ambient temperature. Feed stream 201 may be at 20° C. Feed stream 201 may be at between 10 and 50 bar abs, preferably between 20 and 40 bar abs, more preferably at 30 bar abs.

After passing though main heat exchanger 204, resulting cold feed stream 205 may be two-phase. Cold feed stream 205 may have a vapor fraction of greater than 50%, preferably greater than 65%, and more preferably greater than 75%. Cold feed stream 205 is introduced into phase separator 206, thereby producing liquid fraction 207 and vapor fraction 208. Liquid fraction 207 may comprise greater than 90 mol % nitrogen, preferably greater than 95 mol % nitrogen, more preferably 97 mol % nitrogen. Vapor fraction 208 may comprise greater than 90 mol % hydrogen, preferably greater than 95 mol % hydrogen, more preferably greater than 98 mol % hydrogen.

Compared to H2 PSA, the advantages of cryogenic separation are:
Very high hydrogen recovery i.e. around 99%, compared to 89% for H2 PSA meaning that for the same amount of hydrogen produced the cracking unit is approximately 10% smaller
Possibility to co-produce nitrogen
The main drawback of cryogenic separation:
It is not possible to reach ppm level of N2 in gaseous hydrogen (we are limited by the freezing temperature of nitrogen for the coldest point of the cryogenic condensation)

At atmospheric pressure, hydrogen H2 has a freezing temperature of −259.2° C. and a boiling temperature of −252.8° C. At 30 bar abs, hydrogen has a freezing temperature of −257.7° C. The critical pressure for hydrogen is 13.3 bar abs, so at temperatures above about −259° C., 30 bar abs hydrogen is no longer a liquid or a gas but is supercritical.

At atmospheric pressure, nitrogen N2 has a freezing temperature of −210° C. and a boiling temperature of −196° C. At 30 bar abs, nitrogen has a freezing temperature of −209.2° C. and a boiling temperature of −150.7° C. Clearly, hydrogen will remain a gas (or supercritical) 30 bar range, so it is the nature of the nitrogen that will define the useful temperature ranges of the phase separator.

Thus, in order for the nitrogen component in this two-phase flow to be in the liquid phase, and hence separate properly in phase separator, the temperature of a 30 bar abs partially condensed stream must enter phase separator 206 at between −209.2° C. and −150.7° C. Cold feed stream 205 may be at cryogenic temperature. Cold feed stream 205 may be at −207° C.

Liquid fraction 207 passes through Joule-Thompson valve 209, thereby producing low-pressure liquid or two-phase fraction 210. This Joule-Thomson valve could be replaced by an expander in order to have a more isentropic expansion and to reduce entropy generation. Low-pressure fraction 210 then passes back through main heat exchanger 204, thereby producing nitrogen-rich stream 211. Nitrogen-rich stream 211 may have a pressure of less than 5 bar, preferably 1.2 bar, and be at ambient temperature. Nitrogen-rich stream 211 may have a temperature of 16° C. Nitrogen-rich stream 211 may comprise greater than 97% nitrogen. Nitrogen-rich stream 211 may have the pressure increased in optional nitrogen-rich stream compressor 212, thereby optionally producing compressed nitrogen-rich export stream 213. Nitrogen-rich stream 211 (or compressed nitrogen-rich export stream 213) is then exported from the system as product nitrogen-rich stream 220. At least a portion 221 of nitrogen-rich stream 211 (or compressed nitrogen-rich export stream 213) may be introduced into ammonia cracking unit 222 to be used as fuel.

Vapor fraction 208 passes back through main heat exchanger 204, thereby producing cooled hydrogen-rich stream 214. Cooled hydrogen-rich stream 214 may be at a temperature between −190° ° C. and −200° ° C. and is expanded in hydrogen-rich stream expander 215, thereby producing lower pressure hydrogen-rich stream 216. Lower pressure hydrogen-rich product stream 216 may be 100% vapor. Lower pressure hydrogen-rich product stream 216 may be two-phase or supercritical. Lower pressure hydrogen-rich product stream 216 may have a pressure of around 15 bar abs, and be at cryogenic temperature. Lower pressure hydrogen-rich product stream 216 may be at a temperature lower than −207° C. i.e. −208° C. or −209° C.

Lower pressure hydrogen-rich stream 216 then passes back through main heat exchanger 204, thereby producing hydrogen-rich product stream 217. Hydrogen-rich product stream 217 may have a pressure of around 15 bar abs and be at ambient temperature. Hydrogen-rich product stream 217 may comprise greater than 95% hydrogen, preferably greater than 98% hydrogen.

Part of the cold for the partial condensation of the feed stream is provided by the vaporization of high-purity nitrogen-enriched liquid stream at low pressure (close to atmospheric pressure). The level of cold is around −196° ° C. This is not enough to reach a temperature lower than −207° C. i.e. −208° C. or −209° C. This is why a hydrogen-rich stream expander 215 produces cold at such a level of temperature and a quantity of energy, or work W. In one embodiment, at least a portion of work W is used to at least partially power optional feed gas compressor 202. In one embodiment, at least a portion of work W is used to at least partially power optional nitrogen-rich stream compressor 212.

To produce cold at such a level of temperature, it is not necessary to expand the hydrogen product. A dedicated cycle using hydrogen, helium, neon or a mixture containing at least one of these components could be used. A nitrogen cycle using the vaporization below atmospheric pressure i.e. under vacuum could also be used.

Figure 3:
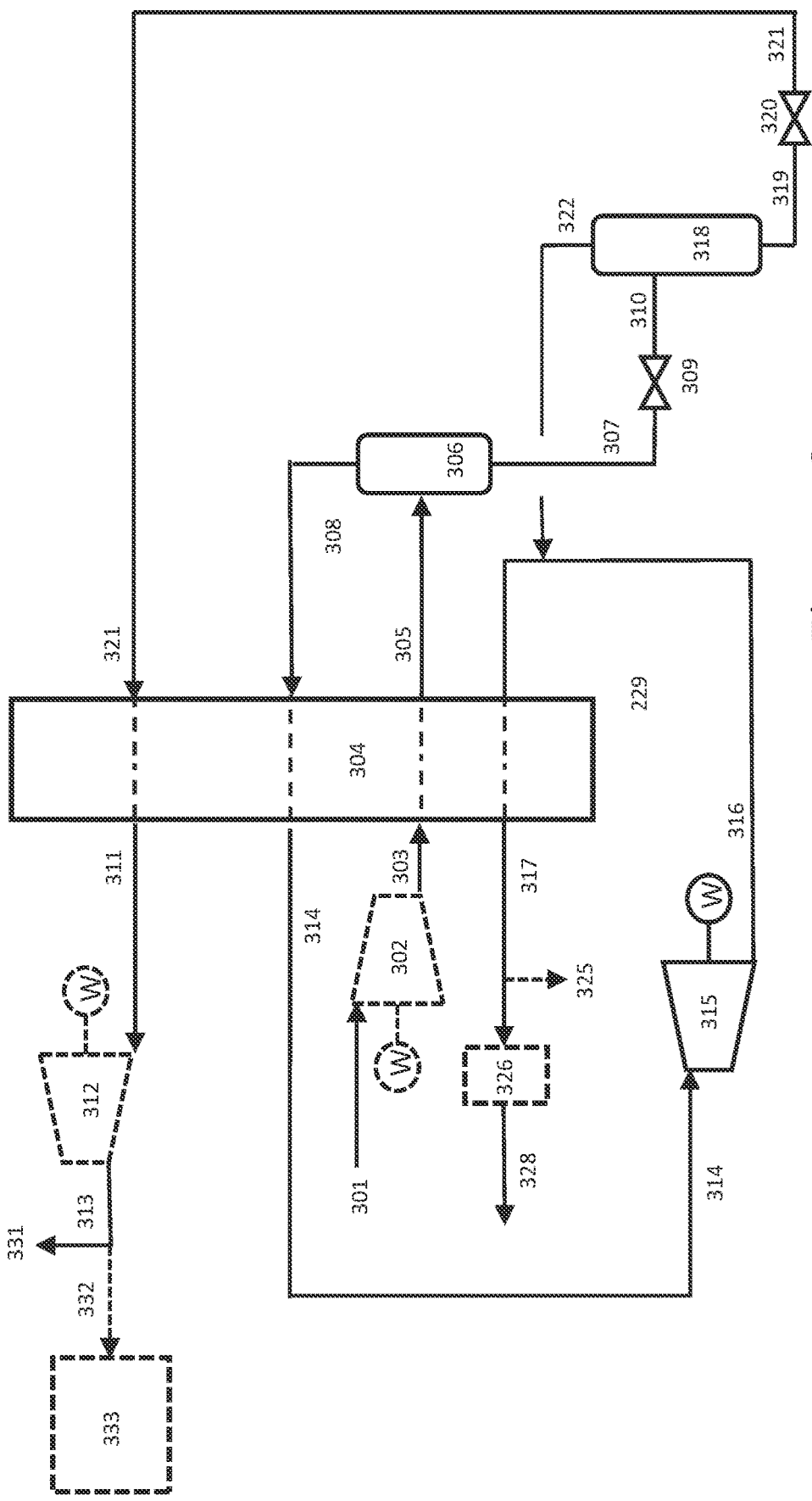
FIG. 3 is a schematic representation of another process scheme, in accordance with one embodiment of the present invention.

Turning to FIG. 3, other embodiments of the present invention are presented. Feed stream 301 is introduced into main heat exchanger 304. Feed stream 301 contains hydrogen and nitrogen and may come from an ammonia cracking unit (now shown). Feed stream 301 may have the pressure increased in optional feed gas compressor 302, thereby optionally producing compressed feed stream 303. Feed stream 301 may contain approximately 75 mol % of hydrogen and 25% mol of nitrogen. Feed stream 301 may be at ambient temperature. Feed stream 301 may be at 20° C. Feed stream 301 may be at between 10 and 50 bar abs, preferably between 20 and 40 bar abs, more preferably at 30 bar abs.

After passing though main heat exchanger 304, resulting cold feed stream 305 may be two-phase. Cold feed stream 305 may have a vapor fraction of greater than 50%, preferably greater than 65%, and more preferably greater than 75%. Cold feed stream 305 may be at cryogenic temperature. Cold feed stream 305 may be at −207 C. Cold feed stream 305 is introduced into first phase separator 306, thereby producing first liquid fraction 307 and first vapor fraction 308. First liquid fraction 307 may comprise greater than 90 mol % nitrogen, preferably greater than 95 mol % nitrogen, more preferably 97 mol % nitrogen. First vapor fraction 308 may comprise greater than 90 mol % hydrogen, preferably greater than 95 mol % hydrogen, more preferably greater than 98 mol % hydrogen.

At atmospheric pressure, hydrogen has a freezing temperature of −259.2° C. and a boiling temperature of −252.8° C. At 30 bar, hydrogen has a freezing temperature of −257.7 C. The critical temperature for hydrogen is 13.3 Bar, so at temperatures above about −259 C, 30 bar hydrogen is no longer a liquid or a gas but is supercritical.

At atmospheric pressure, nitrogen has a freezing temperature of −210 C and a boiling temperature of −196 C. At 30 bar abs, nitrogen has a freezing temperature of −209.2° C. and a boiling temperature of −150.7° C. Clearly, hydrogen will remain a gas (or supercritical) 30 bar range, so it is the nature of the nitrogen that will define the useful temperature ranges of the phase separator.

Thus, in order for the nitrogen component in this two-phase flow to be in the liquid phase, and hence separate properly in phase separator, the temperature of a 30 bar partially condensed stream must enter phase separator 306 at between −209.2 C and −150.7 C. Cold feed stream 305 may be at cryogenic temperature. Cold feed stream 305 may be at −207 C.

Instead of been expanded in a single step to a pressure close to atmospheric pressure, first liquid fraction 307 is expanded in 2 steps, first at a pressure close to the discharge pressure of the hydrogen-rich expansion turbine, second at a pressure close to atmospheric pressure. This is to increase hydrogen recovery and to decrease hydrogen content in nitrogen-rich stream. Therefore, first liquid fraction 307 passes through first Joule-Thompson valve 309, thereby producing first lower-pressure two-phase stream 310. First lower-pressure two-phase stream 310 is introduced into second phase separator 318, thereby producing second liquid fraction 319 and second vapor fraction 322.

Second liquid fraction 319 may comprise greater than 95 mol % nitrogen, more preferably 97 mol % nitrogen. Second liquid fraction 319 passes through second Joule-Thompson valve 320, thereby producing second low-pressure two-phase stream 321. Second low-pressure two-phase stream 321 then passes back through main heat exchanger 304, thereby producing nitrogen-rich stream 311.

Nitrogen-rich stream 311 may have the pressure increased in optional nitrogen-rich stream compressor 312, thereby optionally producing compressed nitrogen-rich export stream 313. At least a portion 331 of nitrogen-rich stream 311 (or compressed nitrogen-rich export stream 313) may be exported from the system. At least a portion 332 of nitrogen-rich stream 311 (or compressed nitrogen-rich export stream 313) may be introduced into ammonia cracking unit 333 to be used as fuel.

Vapor fraction 308 passes back through main heat exchanger 304, thereby producing cooled hydrogen-rich stream 314 at a temperature around −198° C. Cooled hydrogen-rich stream 314 has the pressure decreased in hydrogen-rich stream expander 315, thereby producing low-pressure hydrogen-rich stream 316. Low-pressure hydrogen-rich product stream 316 may be 100% vapor. Low-pressure hydrogen-rich product stream 316 may be two-phase and have less than 1.0% liquid, preferably less than 0.5% liquid. Low-pressure hydrogen-rich product stream 316 may have a pressure of greater than 10 bar, preferably 25 bar, and be at cryogenic temperature. Low-pressure hydrogen-rich product stream 316 may be at −209° C.

Lower-pressure hydrogen-rich stream 316 is combined with stream 322 coming from phase separator 318 and then passes back through main heat exchanger 304, thereby producing first hydrogen-rich product stream 317. First hydrogen-rich product stream 317 may comprise greater than 95% hydrogen, preferably greater than 98% hydrogen. A portion 325 of stream 317 could be produced at such a purity and another portion could go through H2 PSA 326 in order to produce a hydrogen gaseous stream 328 at a higher purity, typically containing least than 100 ppm N2, preferably less 10 ppm N2. Such a high purity gaseous hydrogen stream could be used for other applications or liquefied in a separate hydrogen liquefier or in an integrated hydrogen liquefier i.e. removing heat from this high purity gaseous hydrogen stream portion using at least one of the stream adding heat to the system.

Hydrogen-rich stream expander 315 produces a quantity of energy, or work W. In one embodiment, at least a portion of work W is used to at least partially power optional feed gas compressor 302. In one embodiment, at least a portion of work W is used to at least partially power optional nitrogen-rich stream compressor 212.

Figure 4:
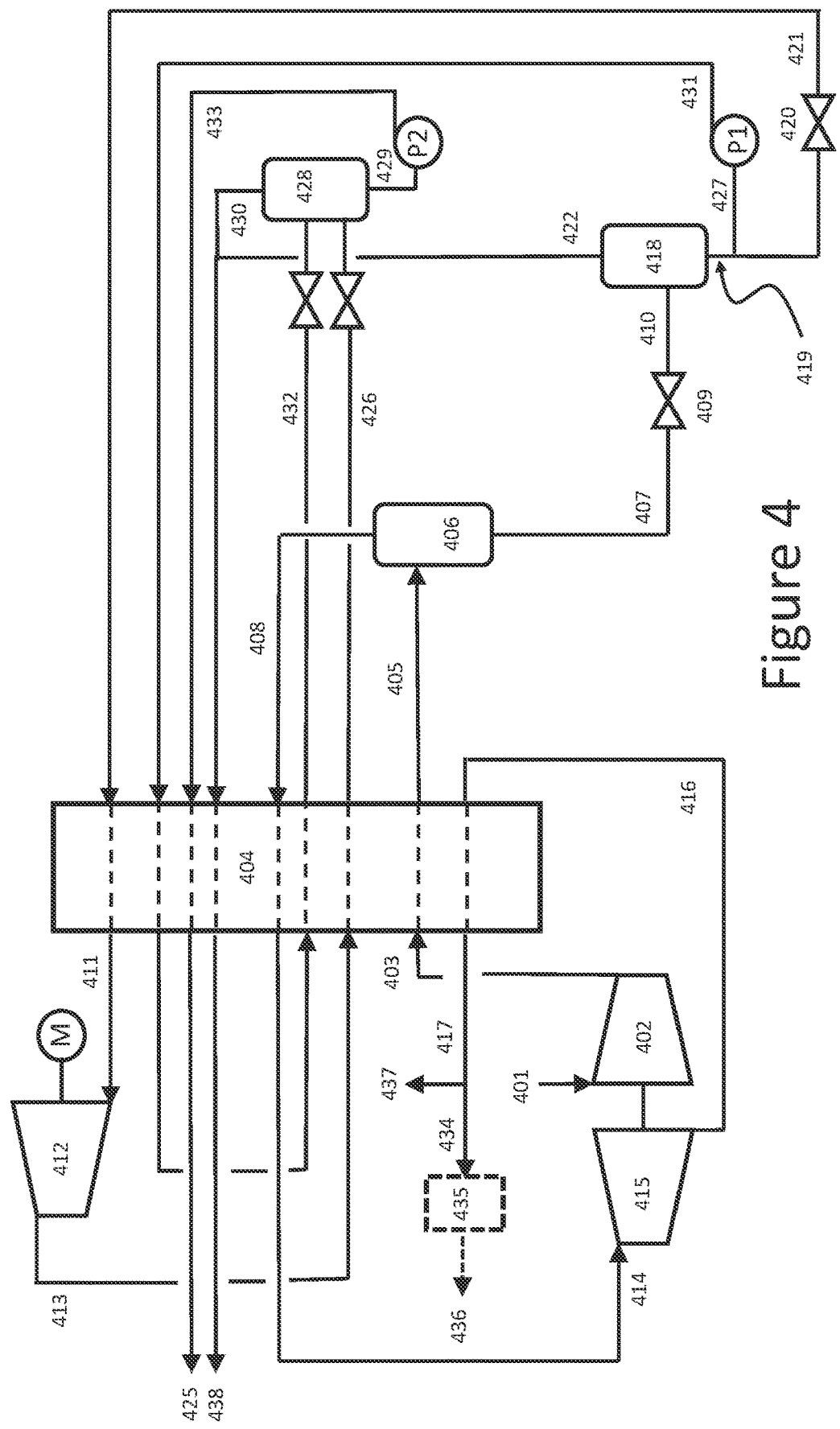
FIG. 4 is a schematic representation of another process scheme, in accordance with one embodiment of the present invention.

Turning to FIG. 4, an additional embodiment of the invention where it is possible to produce at least a portion of nitrogen at a much higher purity typically less than 100 ppm H2, preferably less than 10 ppm H2 is presented.

Feed stream 401 is introduced into feed compressor 402, thereby producing compressed feed stream 403. Compressed feed stream 403 is then introduced into main heat exchanger 404. Feed stream 401 contains hydrogen and nitrogen and may come from an ammonia cracking unit (now shown). Feed stream 401 may contain approximately 75 mol % of hydrogen, and 25% mol of nitrogen. Feed stream 401 may be at ambient temperature. Feed stream 401 may be at 20° ° C. Feed stream 401 may be at between 10 and 50 bar abs, preferably between 20 and 40 bar abs, more preferably at 30 bar abs.

After passing though main heat exchanger 404, resulting cold feed stream 405 may be two-phase. Cold feed stream 405 may have a vapor fraction of greater than 50%, preferably greater than 65%, and more preferably greater than 75%. Cold feed stream 405 may be at cryogenic temperature. Cold feed stream 405 may be at −207 C. Cold feed stream 405 is introduced into first phase separator 406, thereby producing first liquid fraction 407 and first vapor fraction 408. First liquid fraction 407 may comprise greater than 90 mol % nitrogen, preferably greater than 95 mol % nitrogen, more preferably 97 mol % nitrogen. First vapor fraction 408 may comprise greater than 90 mol % hydrogen, preferably greater than 95 mol % hydrogen, more preferably greater than 98 mol % hydrogen.

At atmospheric pressure, hydrogen has a freezing temperature of −259.2° C. and a boiling temperature of −252.8° C. At 30 bar, hydrogen has a freezing temperature of −257.7 C. The critical temperature for hydrogen is 13.3 Bar, so at temperatures above about −259 C, 30 bar is no longer a liquid or a gas but is supercritical.

At atmospheric pressure, nitrogen has a freezing temperature of −210 C and a boiling temperature of −196° C. At 30 bar abs, nitrogen has a freezing temperature of −209.2° C. and a boiling temperature of −150.7° C. Clearly, hydrogen will remain a gas (or supercritical) 30 bar range, so it is the nature of the nitrogen that will define the useful temperature ranges of the phase separator.

Thus, in order for the nitrogen component in this two-phase flow to be in the liquid phase, and hence separate properly in phase separator, the temperature of a 30 bar partially condensed stream must enter phase separator 406 at between −209.2 C and −150.7 C. Cold feed stream 405 may be at cryogenic temperature. Cold feed stream 405 may be at −207 C.

Instead of been expanded in a single step to a pressure close to atmospheric pressure, first liquid fraction 407 is expanded in 2 steps, first at a pressure close to the discharge pressure of the hydrogen-rich expansion turbine, second at a pressure close to atmospheric pressure. This is to increase hydrogen recovery and to decrease hydrogen content in nitrogen-rich stream. Therefore, first liquid fraction 407 passes through first Joule-Thompson valve 409, thereby producing first lower-pressure two-phase stream 410. First lower-pressure two-phase stream 410 is introduced into second phase separator 418, thereby producing second liquid fraction 419 and second vapor fraction 422.

Second liquid fraction 419 may comprise greater than 95 mol % nitrogen, more preferably 97 mol % nitrogen. At least a portion of second liquid fraction 419 passes through second Joule-Thompson valve 420, thereby producing second low-pressure two-phase stream 421. Second low-pressure two-phase stream 421 then passes back through main heat exchanger 404, thereby producing nitrogen-rich stream 411. Nitrogen-rich stream 411 enters nitrogen-rich stream compressor 412 and is elevated to a pressure of about 42 bar abs thereby producing compressed nitrogen-rich stream 413. Compressed nitrogen-rich stream 413 is reintroduced into heat exchanger 404 thereby producing first cold supercritical stream 426.

At least a portion 427 of nitrogen enriched liquid 419 is compressed partially by pump P1 to a pressure of about 42 bar abs, thereby producing pressurized nitrogen enriched liquid stream 431. Pressurized nitrogen enriched liquid stream 431 is reintroduced into heat exchanger 404, thereby producing second cold supercritical stream 432. First cold supercritical stream 426 and second cold supercritical stream 432 are Joule-Thomson expanded to low pressure and introduced in third phase separator 428, thereby producing third liquid fraction 429 and third vapor fraction 430.

Third liquid fraction 429 is increased in pressure in pump P2 to a pressure of about 40 bar abs thereby producing high-pressure high-purity nitrogen-rich stream 433. High-pressure high-purity nitrogen-rich stream 433 is then pseudo-vaporized (because it is supercritical) in heat exchanger 404 thereby producing high purity nitrogen stream 425, which may be at ambient temperature. Third vapor fraction 430 is introduced into main heat exchanger 404 and exits as export stream 438.

If it is desired to produce liquid nitrogen and/or liquid hydrogen, nitrogen-rich stream compressor 412 may also be used to feed one or multiple nitrogen expander to liquefy nitrogen and/or to precool to around −196° ° C. the hydrogen stream to be liquefied. In case liquid hydrogen needs to be produced, hydrogen rich expander 415 may be replaced by multiple high purity hydrogen expanders, this high purity hydrogen having been derived from a H2 PSA (such as 434) but operated at a pressure close to the feed stream pressure i.e. 25 or 30 bar abs.

This process could also be used on the off-gas of a H2 PSA which would treat at least partially the stream coming from the ammonia cracking. In that case, the off-gas enriched in nitrogen would be sent to a compressor and then to the partial condensation. Hydrogen rich stream could be produced at a purity above 95%, preferably above 98% or recycled upstream of the H2 PSA in order to achieve a hydrogen recovery around 99% with a high purity typically less than 100 ppm, preferably less than 10 ppm N2.

A nitrogen rich stream could also be produced either at a purity above 90% preferably above 97% or at high purity i.e. less than 100 ppm H2, preferably less than 10 ppm H2.

Vapor fraction 408 passes back through main heat exchanger 404, thereby producing cooled hydrogen-rich stream 414 at a temperature around −198° C. Cooled hydrogen-rich stream 414 has the pressure decreased in hydrogen-rich stream expander 415, thereby producing low-pressure hydrogen-rich stream 416. Low-pressure hydrogen-rich product stream 416 may be 100% vapor. Low-pressure hydrogen-rich product stream 416 may be two-phase and have less than 1.0% liquid, preferably less than 0.5% liquid. Low-pressure hydrogen-rich product stream 416 may have a pressure of greater than 10 bar, preferably 25 bar, and be at cryogenic temperature. Low-pressure hydrogen-rich product stream 416 may be at −209° C.

Lower-pressure hydrogen-rich stream 416 then passes back through main heat exchanger 404, thereby producing first hydrogen-rich product stream 417. First hydrogen-rich product stream 417 may comprise greater than 95% hydrogen, preferably greater than 98% hydrogen. A portion 434 may be introduced into H2 PSA 435 in order to produce a hydrogen gaseous stream 436 at a higher purity, with the remainder 437 exiting the system as product. Hydrogen gaseous stream 436 typically containing least than 100 ppm N2, preferably less 10 ppm N2. Such a high purity gaseous hydrogen stream could be used for other applications or liquefied in a separate hydrogen liquefier or in an integrated hydrogen liquefier i.e. removing heat from this high purity gaseous hydrogen stream portion using at least one of the stream adding heat to the system.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for separating hydrogen and nitrogen from a gas mixture, comprising:
   a) removing heat from a gas mixture comprising hydrogen and nitrogen, thereby partially condensing the gas mixture and producing a two-phase stream,
   b) phase separating the two-phase stream, thereby producing a nitrogen-enriched liquid fraction and a hydrogen-enriched gaseous fraction,
   c) expanding the nitrogen-enriched liquid fraction, thereby producing a lower-pressure nitrogen-enriched liquid or two-phase stream,
   d) adding heat to the lower-pressure nitrogen-enriched liquid stream, thereby producing a warm nitrogen enriched gaseous stream, and
   e) adding heat to the hydrogen-enriched gaseous fraction, thereby producing a hydrogen-rich product stream,
   wherein,
      at least a portion of the heat added in step d) is removed in step a),
      at least a portion of the heat added in step e) is removed in step a), or
      at least a portion of the heat added in step d) and at least a portion of the heat added in step e) is removed in step a)
      said lower-pressure nitrogen-enriched liquid stream is a two-phase stream and is at a pressure sufficient to allow a nitrogen-enriched vapor fraction to mix with a lower-pressure hydrogen-rich stream after phase separation.

2. The method of claim 1 wherein the gas mixture is derived from an ammonia cracking unit.

3. The method of claim 1, wherein the partial condensation of the gas mixture takes place at a separation pressure, and a temperature between the boiling temperature of the gas mixture at atmospheric pressure and the freezing temperature of the nitrogen at the separation pressure.

4. The method of claim 1, further comprising removing heat from at least a portion of the hydrogen-enriched gaseous fraction thereby producing a product liquid hydrogen-enriched stream.

5. The method of claim 1, wherein at least a portion of the warm nitrogen enriched gaseous stream is introduced into an ammonia cracking unit to be used as fuel.

6. The method of claim 1, wherein the hydrogen-rich product stream comprises greater than 98% hydrogen.

7. The method of claim 1, wherein the warm nitrogen enriched gaseous stream comprises greater than 99.99% nitrogen.

8. The method of claim 6, wherein the warm nitrogen enriched gaseous stream comprises greater than 99.999% nitrogen.

9. The method of claim 1, further comprising a feed gas compressor,
- wherein hydrogen-enriched gaseous fraction is expanded in a hydrogen-rich stream expander,
- wherein the hydrogen-rich stream expander produces a quantity of work, and
- wherein at least a portion of the quantity of work is utilized by the feed gas compressor.

10. The method of claim 1, further comprising a nitrogen-rich stream compressor,
- wherein the nitrogen-enriched liquid fraction is expanded in a hydrogen-rich stream expander,
- wherein the hydrogen-rich stream expander produces a quantity of work and
- wherein at least a portion of the quantity of work is utilized by the nitrogen-rich stream compressor.

11. The method of claim 1, further comprising a pressure swing adsorption unit, wherein a hydrogen-rich product stream is introduced into the pressure swing adsorption unit, thereby producing purified hydrogen-rich product stream.

12. The method of claim 11, further comprising a pressure swing adsorption unit, wherein the nitrogen-rich product stream from said pressure swing adsorption unit is at least partially compressed and from at least part of said gas mixture of claim 1.

* * * * *